US008775568B2

(12) United States Patent
Moran et al.

(10) Patent No.: US 8,775,568 B2
(45) Date of Patent: *Jul. 8, 2014

(54) METHOD AND APPARATUS FOR PROVIDING A WEB PAGE TO A CALL MEMBER

(75) Inventors: Thomas J. Moran, Galway (IE); John P. McSweeney, Galway (IE)

(73) Assignee: Apple Inc., Cupertino, CA (US)

( * ) Notice: Subject to any disclaimer, the term of this patent is extended or adjusted under 35 U.S.C. 154(b) by 348 days.

This patent is subject to a terminal disclaimer.

(21) Appl. No.: 12/970,238

(22) Filed: Dec. 16, 2010

(65) Prior Publication Data

US 2011/0085544 A1 Apr. 14, 2011

Related U.S. Application Data

(63) Continuation of application No. 09/747,691, filed on Dec. 22, 2000, now Pat. No. 7,877,444.

(51) Int. Cl.
*G06F 15/16* (2006.01)
(52) U.S. Cl.
USPC .................. 709/219; 709/205; 379/93.17
(58) Field of Classification Search
USPC .................. 709/205, 219; 370/389
See application file for complete search history.

(56) References Cited

U.S. PATENT DOCUMENTS

| 5,907,547 | A | 5/1999 | Foladare et al. |
| 5,987,102 | A * | 11/1999 | Elliott et al. ............... 379/93.17 |
| 6,192,123 | B1 * | 2/2001 | Grunsted et al. ............ 379/350 |
| 6,219,709 | B1 | 4/2001 | Byford |
| 6,263,365 | B1 | 7/2001 | Scherpbier |
| 6,295,551 | B1 | 9/2001 | Roberts et al. |
| 6,326,782 | B1 | 12/2001 | Schroeder |

(Continued)

FOREIGN PATENT DOCUMENTS

WO          00/46963          8/2000

OTHER PUBLICATIONS

Peters M. et al; "Mobile or mobility? Evolution of mobility services;" Alcatel Telecommunications Review, Alcatel, Paris Cedex, FR, Apr. 1, 2000; pp. 109-115.

(Continued)

*Primary Examiner* — Yves Dalencourt
(74) *Attorney, Agent, or Firm* — Meyertons, Hood, Kivlin, Kowert & Goetzel, P.C.

(57) ABSTRACT

One problem with web-based information is that it is typically presented without being personalised or tailored to fit a particular user's needs and requirements. Another problem relates to calls such as telephone calls, video calls or other multimedia calls made between two or more call members. Here it is often required to provide detailed information during the call. By storing a plurality of web pages and associating each of those web pages with information about one or more potential calls, it is possible to select one of those web pages for provision to a particular call member. For example, a user may store a web page for provision to family members, another for customers, and another for new enquiries. Information about a call is obtained and used to select an appropriate one of the stored web pages. This selected web page is then provided to the call member which is for example a wireless terminal with a web browser arranged to display the web page. The web pages may be stored on a web server or alternatively on the terminal used by the call member to take part in the call.

15 Claims, 11 Drawing Sheets

(56) References Cited

U.S. PATENT DOCUMENTS

| | | |
|---|---|---|
| 6,615,276 B1 | 9/2003 | Mastrianni et al. |
| 6,675,204 B2 | 1/2004 | De Boor et al. |
| 6,678,718 B1 | 1/2004 | Khouri et al. |
| 2002/0046281 A1 | 4/2002 | Cope |
| 2002/0059378 A1* | 5/2002 | Mustafa .................. 709/205 |

OTHER PUBLICATIONS

Office Action in U.S. Appl. No. 12/836,139, mailed Dec. 5, 2012, pp. 1-18; available in USPTO Patent Application Information Retrieval database.

* cited by examiner

| Page # | Group | Phone # |
|---|---|---|
| Page 1 | Wife, | Phone # 12345678 |
| Page 2 | Secretary, | Phone # 87654321 |
| Page 3 | group direct reports, | Phone xxx..., yyy..., zzz..., |
| Page 4 | rest of world | |

51   52   53

54

Mobile telephone — 55

Mobile telephone — 61

63

62

Mobile telephone — 60

Figure 8

John's Phone Configuration

| Call direction | Page # | Group | Phone # |
|---|---|---|---|
| incoming | Page 1 | whole world | |
| Outgoing | Page 2 | Whole world | |

Tommy's Phone Configuration

| Call direction | Page # | Group | Phone # |
|---|---|---|---|
| incoming | Page 1 | Whole world | |
| Outgoing | Page 1 | Whole world | |

Server Overview:

METHOD AND APPARATUS FOR PROVIDING A WEB PAGE TO A CALL MEMBER

RELATED APPLICATION

This application is a continuation of U.S. patent application Ser. No. 09/747,691, filed Dec. 22, 2000, now U.S. Pat. No. 7,877,444.

FIELD OF THE INVENTION

The present invention relates to a method and apparatus for providing a web page to a call member. The invention is particularly related to but in no way limited to providing a personalised web page to a call member.

BACKGROUND TO THE INVENTION

One problem relates to calls such as telephone calls, video calls or other multimedia calls made between two or more call members. Here it is often required to provide detailed information during the call. For example, during a telephone call a caller may wish to provide detailed background information about products, price lists, address and contact details and other information. It is difficult and time consuming for the caller to convey all this information to the destination party quickly and accurately and in a manner that is tailored to fit the destination party's requirements.

One way of providing detailed information to others is via the internet. However, one problem with web-based information is that it is typically presented without being personalised or tailored to fit a particular user's needs and requirements. For example, many web sites simply present information that is accessible to users in a similar manner to information presented in a hard copy encyclopaedia. The same information is available to all users and it is necessary for individual users to search to find the particular information required for their task. This is time consuming and frustrating for the user. More recently, web sites which present personalised information to users have been developed. However, these do not enable such personalised information to be presented in a manner that is integrated with a call such as a telephone call, video call or other multimedia call.

Wireless application protocol (WAP) is a global open standard for enabling internet based information and services to be provided to digital mobile telephones and other wireless devices (e.g. pagers and smartphones). Using WAP technology wireless access to internet content and internet based services is possible. For example, a WAP enabled mobile telephone can be used to download and view WAP pages from a WAP site on the internet. This is achieved by setting up a data call from the mobile telephone to the WAP site. However, data accessed from a WAP site in this way is not personalised or tailored to fit a particular user's needs and is not integrated with a voice call.

It is accordingly an object of the present invention to provide a method and apparatus for providing a web page to a call member which overcomes or at least mitigates one or more of the problems noted above.

Further benefits and advantages of the invention will become apparent from a consideration of the following detailed description given with reference to the accompanying drawings, which specify and show preferred embodiments of the invention.

SUMMARY OF THE INVENTION

According to an aspect of the present invention there is provided a method of providing a web page to a call member comprising the steps of:
  accessing a plurality of web pages; each of the web pages being associated with pre-specified information about potential calls; and
  selecting one of the web pages using information about the call and providing the selected web page to the call member.

For example, the call member can be the originator of a telephone call. Several web pages have been specified in advance by another, for example, the receiver of the telephone call. Those web pages are tailored to suit different groups of users, such as business colleagues or family members. The web pages are associated with pre-specified information about potential calls. For example, this may be information about telephone numbers of potential call members. For example, a web page suited for family members may be associated with information about those family members. Using information about the call (e.g. the phone number of the originator of the call) one of the web pages (specified in advance by the receiver of the call) is selected and provided to the call member. Alternatively, the pre-specified information may be information about the time of day that calls take place. A particular web page can then be presented to call members where the call takes place during office hours and a different web page to call members where the call takes place outside office hours.

This provides the advantage that a web page which is suited to the call member's requirements is provided to that call member. For example, one web page may be suitable for family members and contain the user's contact details and calendar information and another web page may contain information about the user's business suitable for customers. By using information about the call the most suitable web page for a call member is chosen and provided to that call member.

According to another aspect of the present invention there is provided an apparatus for providing a web page to a member of a call. For example, is this apparatus can be a web server. The apparatus comprises:
  an input arranged to access a plurality of web pages; each of the web pages being associated with pre-specified information about potential calls; and
  a processor arranged to select one of the web pages using information about the call and to provide the selected web page to the call member.

According to another aspect of the present invention, a computer program for controlling such an apparatus or web server is provided. The computer program is arranged to control the apparatus in order to provide a web page to a member of a call, said computer program being arranged to control the apparatus such that:
  a plurality of web pages are accessed; each of the web pages being associated with pre-specified information about potential calls; and
  one of the web pages is selected using information about the call and the selected web page is provided to the call member.

According to another aspect of the present invention there is provided a method of displaying a web page at a telephone terminal that comprises a web browser arranged to display web pages on the terminal. For example, this method could be carried out by a telephone terminal. The method comprises the steps of:

on initiation or receipt of a telephone call by the telephone terminal, establishing communication with a source that has access to a plurality of web pages, each of the web pages being associated with pre-specified information about potential calls;

receiving a web page from the source, said web page having been selected using information about the telephone call; and displaying the selected web page on the telephone terminal.

According to another aspect of the present invention there is provided a web site comprising a plurality of web pages, each web page being associated with pre-specified information about potential calls. This provides the advantage that a service may be provided to call members whereby personalised web pages are provided to those call members.

According to another aspect of the present invention there is provided a telephone terminal comprising:

a plurality of web pages, each web page being associated with pre-specified information about potential calls with the telephone terminal; and a web browser arranged to display web pages on the telephone terminal.

This provides the advantage that no additional web server is required to store the web pages because these are stored on the telephone terminals themselves which therefore act as simplified web servers.

The invention also provides for a system for the purposes of digital signal processing which comprises one or more instances of apparatus embodying the present invention, together with other additional apparatus.

The preferred features may be combined as appropriate, as would be apparent to a skilled person, and may be combined with any of the aspects of the invention.

BRIEF DESCRIPTION OF THE DRAWINGS

In order to show how the invention may be carried into effect, embodiments of the invention are now described below by way of example only and with reference to the accompanying figures in which:

FIG. 8 gives details of two telephone configurations in which web pages are associated with information about potential calls.

DETAILED DESCRIPTION OF INVENTION

Embodiments of the present invention are described below by way of example only. These examples represent the best ways of putting the invention into practice that are currently known to the Applicant although they are not the only ways in which this could be achieved.

The term "telephone terminal" is used to refer to any device comprising a user interface that enables a user to make a telephone call. For example, a conventional telephone handset, a mobile telephone handset, a personal computer comprising software for providing telephone functionality (PC phone) or a personal digital assistant (PDA) with telephone capability.

The term "web page" is used herein to refer to information intended to be provided via the Internet or other Internet protocol communications network, to a user interface for display using a web-browser. For example, hyper text mark-up language (HTML) pages, Java script pages, active server pages (ASP) pages and WAP pages using wireless mark-up language (WML) are all examples of web pages. The user interface display may be a mobile telephone display, a computer screen or any other suitable user interface.

A first embodiment of the present invention is now described in which communication between mobile telephone handsets takes place over the local area network (or intranet) of an enterprise. However, the invention is not limited to communication between mobile telephone handsets; any other suitable communications devices may be used. Also, the invention is not limited to communication over local area networks; any suitable communications network may be used.

Figure 1:
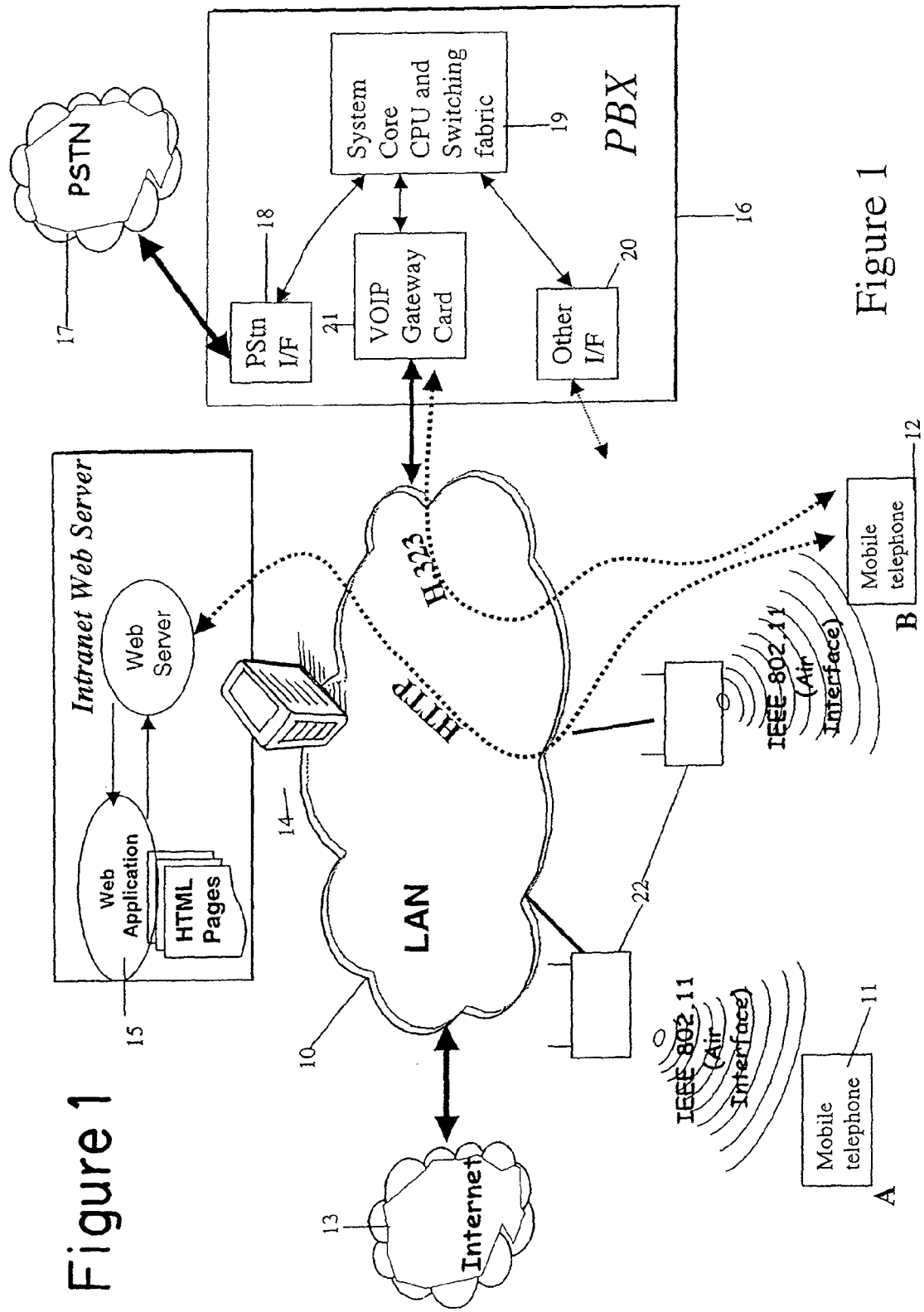
FIG. 1 shows a communications network with an apparatus for providing a personalised web-page to a call member.

FIG. 1 shows a communications network with an apparatus for providing a web page to a call member. The communications network comprises a local area network (LAN) 10, such as a LAN arranged for use by a particular enterprise. The LAN is connected to the Internet 13 although this is not essential. The LAN also comprises a private branch exchange (PBX) 16 which is connected to a public switched telephone network 17.

The LAN comprises one or more mobile communications base stations 22 which are arranged to communicate with mobile telephones 11, 12 or other suitable wireless communications devices. This is achieved using an air interface such as the IEEE 802.11 protocol.

Each mobile telephone 11, 12 has a simple web browser capability and is able to communicate with an intranet web server 14 which is connected to the LAN 10. For example, each mobile telephone 11, 12 supports hyper text transfer protocol (HTTP), request for comments (RFC) 2616 and is able to display simple hyper text mark-up language (HTML) pages. Communication between the mobile telephones 11, 12 and the web server 14 takes place via either one of the mobile communications base stations 22. This is indicated by the schematic dotted arrow labelled HTTP in FIG. 1 between mobile telephone 12 and web server 14.

In order for a voice call to take place between one of the telephone handsets 11, 12 and another terminal (which may be connected to the LAN, internet or PSTN) the private branch exchange 16 is used. As is known in the art, the PBX 16 comprises a voice over internet protocol (VOIP) gateway card 21 which is connected to a system core central processing unit (CPU) and switching fabric 19. Voice calls from one of the mobile telephones 12 are received via the LAN at the VOIP gateway card 21. The system core CPU and switching fabric 19, switches these calls as is known in the art, to the required destination. The required destination may be within the PSTN 17, internet 13, LAN 10 or may be a mobile telephone in communication with the LAN 10. In the case that such a voice call is switched to a terminal within the PSTN 17 the call passes through a PSTN interface 18 in the PBX 16. In the case that the voice call is switched to a terminal within the LAN 10 or internet 13 the call passes either via the VOIP gateway card 21 or via another interface 20.

Communication between one of the mobile telephones 11, 12 and the PBX 16 takes place using H.323 protocol which supports real time voice communication over the intranet and internet. This communication takes place via either of the mobile communications base stations 22 as indicated by the schematic dotted arrow labelled H.323 in FIG. 1. Each mobile telephone 11, 12 thus supports H.323 protocol and has a basic capability to trigger web page requests based on voice call activity. This is explained in more detail below.

The web server 14 comprises a web application 15 comprising a plurality of HTML or other suitable web pages. The web application 15 is arranged to provide personalised web pages to call members as described below with reference to FIG. 2.

Figure 2:
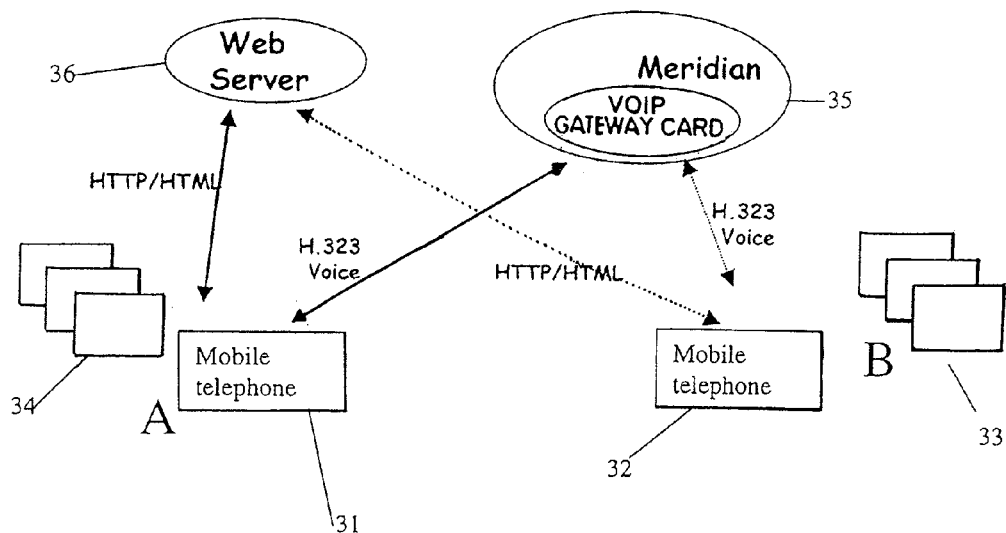
FIG. 2 is a schematic diagram showing a system for provision of personalised web pages to a caller and a receiver of a wireless telephone call.

FIG. 2 is a schematic diagram showing a system for provision of personalised web pages to a caller and/or a receiver of a wireless telephone call. FIG. 2 can be thought of as a simplified version of FIG. 1. Two mobile telephones 31, 32 are shown each of which is able to communicate with a VOIP gateway card 35 using H.323 protocol. In this way voice calls are possible between the two mobile telephones 31, 32 over a LAN or other data communications network as in FIG. 1. Each of the mobile telephones 31, 32 is also able to communicate with a web server 36 using for example the HTTP protocol as described above with reference to FIG. 1.

The user of the mobile telephone 31 labelled A in FIG. 2 pre-specifies a plurality of web pages 34 that are stored on or accessible to the web server 36. For example, one of the web pages may contain information suitable for user A's family and another of the web pages may contain information suitable for user A's business colleagues. Each of these web pages is associated with pre-specified information about one or more potential calls. This information can comprise information about potential call members. For example, the web page for user A's family is associated with directory numbers (DNs) for user A's family members e.g. user A's daughter's phone number. The pre-specified information can also comprise information about the time of day that a call takes place or any other suitable information.

Similarly, the user of mobile telephone B pre-specifies a plurality of web pages 33 that are also stored on or accessible to the web server 36. These web pages are designed for use by different groups of potential call members in the same way as for user A's web pages.

If the user of mobile telephone A initiates a voice call to the user of mobile telephone B, one of B's web pages 33 is provided to A. The same applies if the user of mobile telephone A receives a call from B. In that case, one of B's web pages 33 is provided to A. In this way a voice call and provision of web pages takes place at the same time. The user is able to carry out the voice call at the same time as viewing the web pages, for example, by using a headset to enable the mobile telephone screen to be viewed whilst a conversation takes place using the voice call. Alternatively, the user speaks into the mobile phone and when not speaking is able to view the display screen and listen to the other party to the call. In the case that a PC phone is used instead of a mobile telephone, the user is easily able to view the web pages whilst carrying out the telephone conversation.

Considering the user of mobile telephone B, if B initiates or receives a call from A, then one of A's web pages 34 is provided to B.

In order that personalised web pages are presented, the associations between the web pages and pre-specified information about potential calls is used. For example, linked to each web page is one or more telephone numbers of potential callers who should be presented with that web page. When a call is initiated or received, a request is sent to the web server together with information about the call members. For example, this information comprises the directory number of the call originator and the call destination. Using this information the web server is able to select a suitable web page for presentation as described in more detail below. Alternatively, other information such as the time of day that a call is initiated may be used.

Figure 4:
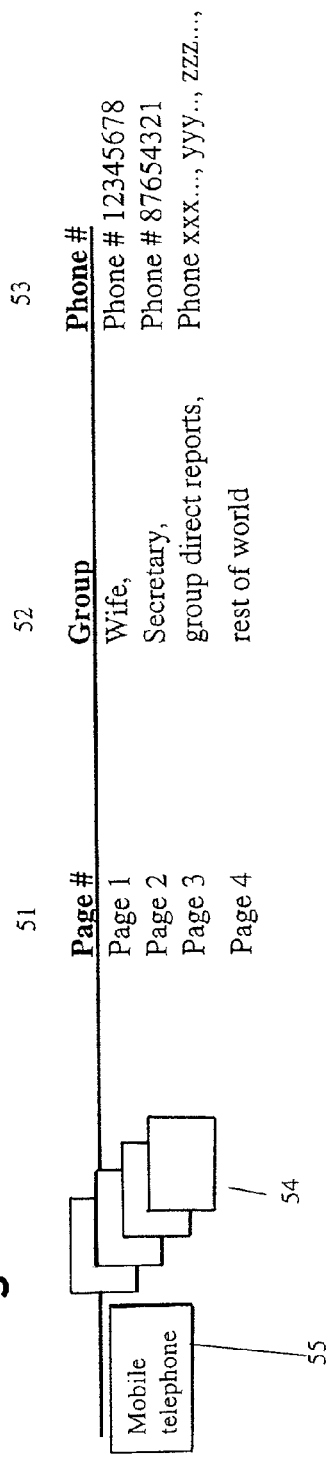
FIG. 4 shows an example of how stored web pages are associated with information about potential call members.

FIG. 4 indicates one example of how a user's web pages are associated with pre-specified information about potential calls. User of mobile telephone 55 pre-specifies a plurality of web pages 54, in this case four web pages. A look up table is specified by the user and comprises a column 51 indicating each web page, a column indicating a group of potential call members 52 and a column containing telephone numbers of potential call members 53. By using the look up table in this way, web page 1 is associated with the user's wife's telephone number, web page 2 is associated with the user's secretary's telephone number, web page 3 is associated with the telephone numbers of those people managed by the user and web page 4 is associated with any other potential telephone numbers. Other ways of associating web pages with information about potential calls may be used instead of a look up table. For example, rules can be used, such as "IF a call is outgoing, THEN present web page number 1".

The web pages themselves are pre-specified by a user and contain information suited to a particular group of users. For example, a web page suited for the user's secretary may contain calendar information, the current location of the user (provided using global positioning information for example) and other information. A web page suited for the user's customers may contain details of products, prices and links to a main business web site. In order to simplify the process of specifying web pages, a service by which users are offered standard web page templates from which to choose their own web pages is offered. This service is provided over the internet such that the user is able to select appropriate web pages from the available templates using his or her mobile telephone or other communications device. Alternatively, the available templates can be accessed from a personal computer web browser and customised as required by the user. In order to simplify the process of customising such web pages, limited forms of customisation are possible and text can be entered in a similar fashion to that used by existing short message service (SMS) services. This enables users who are not experts to customise their web pages.

Figure 5:
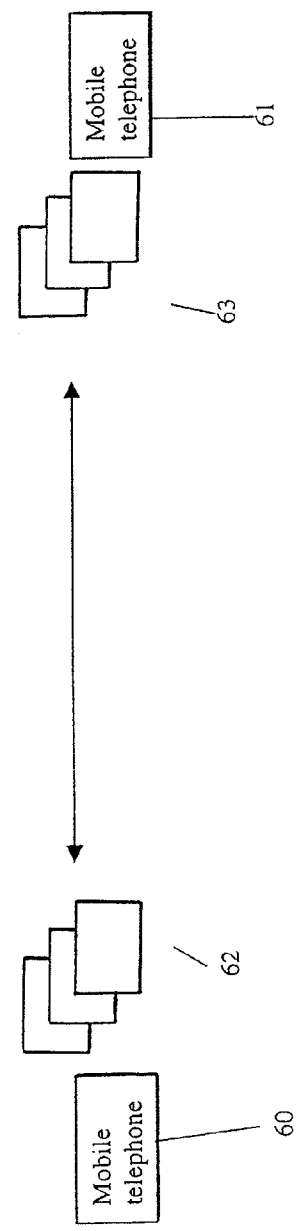
FIG. 5 is a schematic diagram showing another system for provision of personalised web pages to a caller and receiver of a wireless telephone call suitable for use with the embodiment of FIG. 3.

FIG. 5 illustrates another embodiment of the invention in which the web pages are stored on the mobile telephones (or other suitable terminals) themselves instead of on a web server. For example, mobile telephone 60 comprises a plurality of web pages 62 that have been pre-specified by the user of that telephone and have been associated with information about potential call members. This is also the case for mobile telephone 61 which comprises a plurality of web pages 63. In this embodiment, each mobile telephone acts as a type of web server but is able to receive only one "hit" or web page request at a time.

Figure 3:
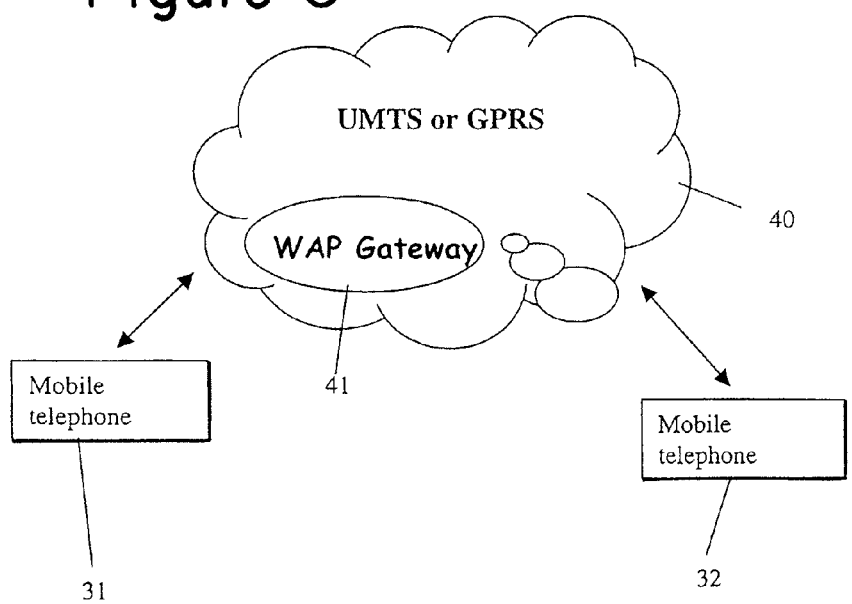
FIG. 3 shows an example of the system of FIG. 2 for use in another embodiment of the invention using wireless access protocol (WAP) and next generation wireless technology such as universal mobile telecommunications system (UMTS) or general packet radio service (GPRS)

FIG. 3 shows an example of the system of FIG. 2 which is suitable for use with the embodiment of FIG. 5. The example of FIG. 3 uses wireless access protocol (WAP) and next generation wireless technology such as general packet radio service (GPRS) or UTMS. In this case, access to a GPRS or UTMS data communications network 40 comprising a WAP gateway 41 is provided. Simultaneous voice and data calls between the mobile telephones are then possible for example, using GPRS class A mobile telephones.

Figure 6:
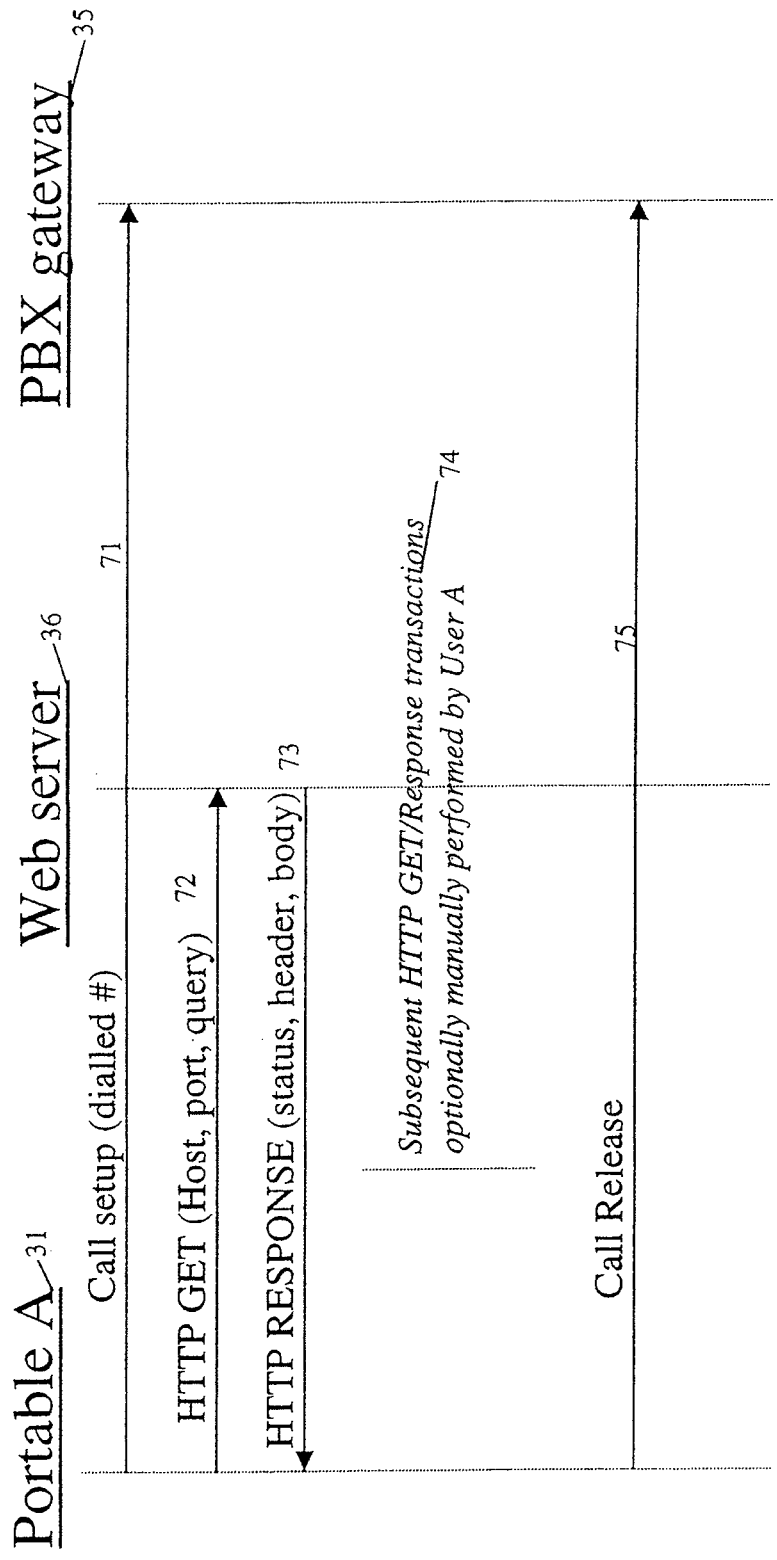
FIG. 6 is a high level message sequence chart in the case that portable telephone A of FIG. 2 initiates a call.

Consider the situation when mobile telephone A 11 of FIG. 1 is used to initiate a telephone call to mobile telephone B 12 of FIG. 1. FIG. 6 is a high level message sequence chart indicating the method that takes place in order to provide a personalised one of B's web pages to A.

In the message sequence chart of FIG. 6 vertical lines are used to represent entities from the communications network of FIG. 1. Mobile telephone A 11 of FIG. 1 is represented as vertical line 31 in FIG. 6. Similarly, web server 14 of FIG. 1 is represented as vertical line 36 in FIG. 6 and VOIP gateway card 21 (also referred to as a PBX gateway) is represented as vertical line 35 in FIG. 6. Horizontal arrows in FIG. 6 represent the flow of messages between the entities represented by the vertical lines and the relative positions of those arrows on the height of the page represents the chronological order of the messages.

Using mobile telephone A, a call is initiated to B by dialling B's telephone number. This telephone number is sent from mobile telephone A to the PBX gateway 35 as indicated by arrow 71 in FIG. 6 as part of an H.323 call set up message. As mentioned above, each mobile telephone has the capability to trigger web page requests based on voice call activity. Thus, as a result of the telephone number being sent from mobile telephone A to the PBX gateway 35, the mobile telephone A sends an HTTP GET command to a pre-defined address which is that of the web server 36. This HTTP GET command comprises a host field, a port field and a query field. As part of the query field the mobile telephone A includes information about the call. In this example, that information comprises:
  the calling line identity of mobile telephone A (i.e., A's telephone number); and
  the called party telephone number (i.e. B's telephone number), as sent with the previous H.323 call set up message 71.

The web server 36 uses this information from the query field to select a web page for presentation on mobile terminal A. This selected web page is provided to mobile terminal A 31 using an HTTP response message as indicated by arrow 73 in FIG. 6. In this way a personalised web page may be provided to mobile terminal A 31 even before the call is completed (i.e. whilst the ringing tone is still sounding).

Subsequent HTTP Get/response transactions may then be carried out manually by user A during the call (see 74 in FIG. 6). For example, if the selected web page presented to user A contains links, the user of mobile telephone A may activate those links to view further web pages. Eventually the call ends and a call release message is sent from mobile terminal A to the PBX Gateway as indicated by arrow 75 in FIG. 6. When the call ends, communication between the mobile terminal and the web server may also be terminated. Alternatively, the user may have the option to continue surfing the web whilst the call has ended.

Selection of a Personalised Web Page

The process of selecting a personalised web page is carried out by a web based application at the web server, or any other suitable selection software, for example, located at one of the mobile telephones or other terminals. As mentioned above the selection is made on the basis of information about the call such as a call member's telephone number or the time that the call is initiated. Other information about the call may also be used together with information about the history of web page selections made during a certain time period. Information about the time of day is made available to the selection software and used to select an appropriate web page. In this case, different versions of each web page are available for different times of day and each web page is associated with time of day information.

In another example, information about the history of web page selections is made available to the selection software. For example, the software may record the web pages sent to a particular mobile telephone during the last week. When a new request is received from that mobile, a web page is selected which is different from the previous web pages sent to that mobile.

Figure 13:
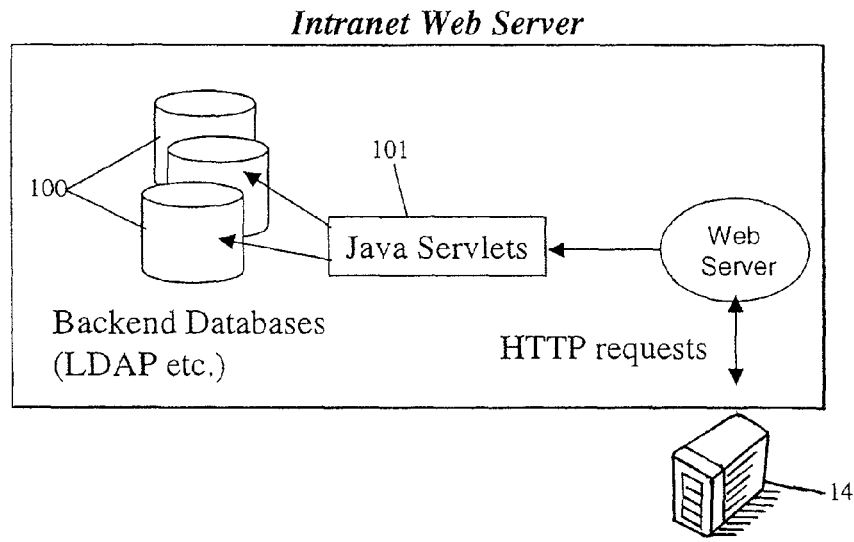
FIG. 13 shows more detail of the intranet web server 14 of FIG. 1.

FIG. 13 shows more detail of an example of the intranet web server 14 of FIG. 1. The web server 14 either comprises or has access to backend databases 100 which store the web pages or alternatively store information to create the web pages dynamically. Any suitable type of backend databases 100 may be used such as light weight directory access protocol (LDAP) enabled databases. Each of those web pages is associated with information about potential call members as explained above. The required logic to retrieve the appropriate web pages (or information for creating the required web pages) is encapsulated using Java servlets. That is, the selection software is encapsulated using Java servlets 101. When a HTTP request reaches the web server 14, this request triggers a java servlet 101 which is sent to the backend databases 100 and retrieves the selected web page. The HTTP request contains information such as the phone numbers of the call members and this information is used by the Java servlets to select an appropriate web page from the backend databases 100. The Java servlets 101 then build up an HTML response message comprising the selected web page and send this to the mobile terminal which made the initial HTTP request.

Figure 7:
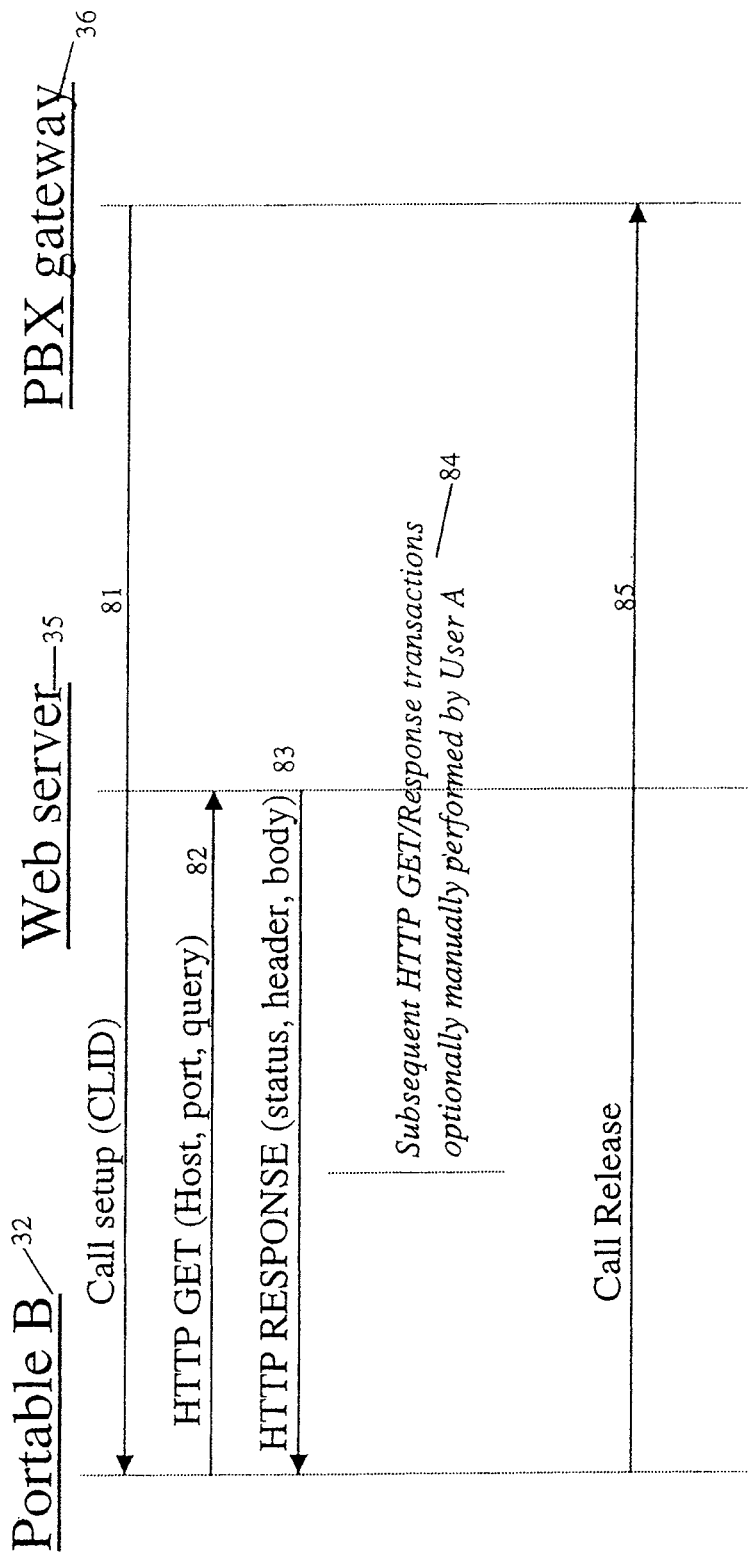
FIG. 7 is a high level message sequence chart in the case that portable B of FIG. 2 receives a call.

FIG. 7 is a high level message sequence chart for the situation where user of mobile telephone B 12 in FIG. 1 receives a telephone call from mobile telephone A 11 in FIG. 1. As for FIG. 6, the vertical lines represent entities from the communications network of FIG. 1 and the same reference numerals are used as in FIG. 6 where appropriate.

When mobile telephone (or portable) B 32 receives a call, it receives a Call setup message 81 from the PBX gateway 36 which comprises the caller line identity (CLID) of mobile telephone A (i.e. A's telephone number). On receipt of this call setup message 81 an HTTP GET message 82 is automatically sent by the mobile telephone 32 to a predefined address which is that of the web server 35. The HTTP GET message 82 comprises a host field, a port field and a query field. The mobile telephone B 32 adds information about the call to that query field such as B's telephone number and the CLID received in the previous call setup message (i.e. A's telephone number). Using this information the web server selects a personalised web page and provides this to mobile telephone B 32. This is achieved using an HTTP RESPONSE message 83 as shown in FIG. 7.

The user of mobile telephone B is then able to carry on viewing web pages by making manual HTTP GET requests (see 84 in FIG. 7).

Eventually the call is released (see 85 in FIG. 7) and display of web pages on mobile telephone B is either terminated with the call release 85 or permitted to continue after the call.

The methods of FIGS. 6 and 7 are preferably carried out together such that one of A's web pages is selected for display on B's telephone and vice versa. Thus, during a telephone call between A and B, both A and B are able to access web pages that are tailored for them and provide information which would otherwise be difficult or if not impossible to present over the telephone call itself.

Figure 9:
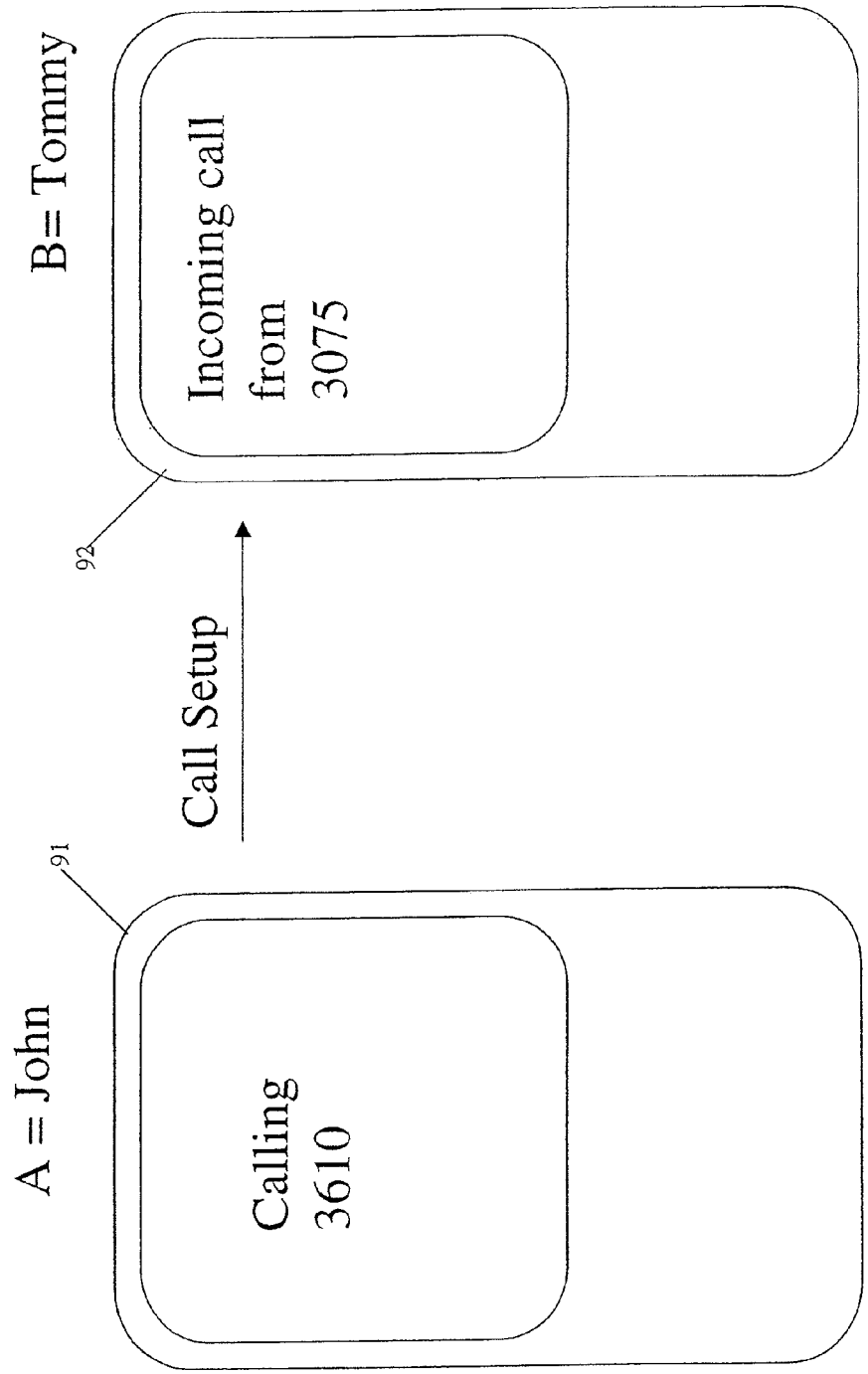
FIG. 9 is a schematic diagram of two mobile telephones showing the displays on those telephones when a call is initiated.
Figure 10:
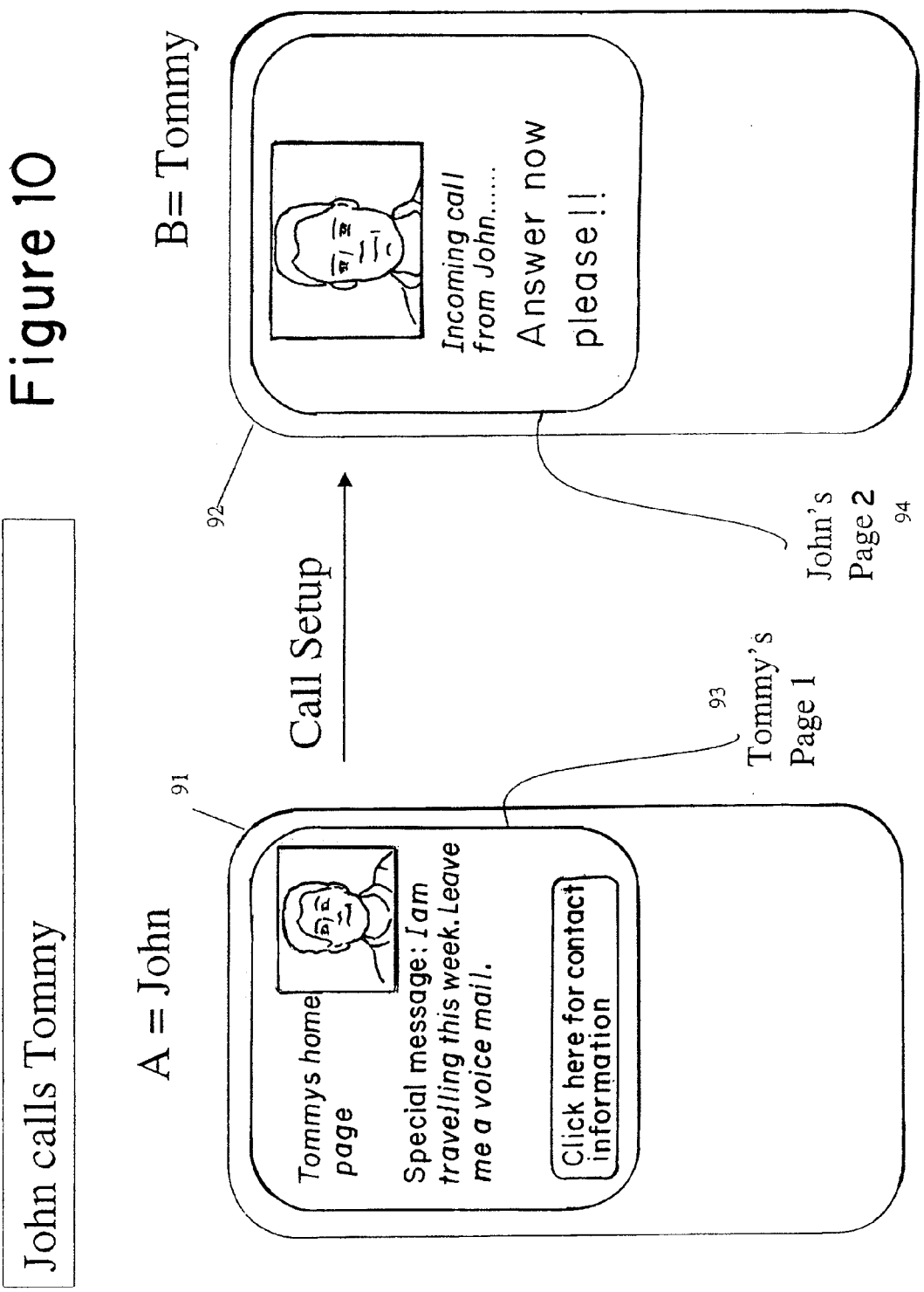
FIG. 10 shows the two mobile telephones of FIG. 9 when personalised web pages are displayed on the telephones.

FIGS. 8, 9 and 10 are now discussed in order to explain an example in which one of A's web pages is selected for display on B's telephone and vice versa. Instead of A and B this example is discussed with reference to John and Tommy, where John is the user of telephone A and Tommy is the user of telephone B.

John and Tommy first set up web pages and associate those web pages with particular groups of potential call members. The results of this process are indicated in FIG. 8 which shows a look up table for John's phone configuration and a similar table for Tommy. John specifies two web pages where page 1 is associated with any potential incoming call and page 2 is associated with any outgoing call as indicated in FIG. 8. However, Tommy only specified one web page which is associated with both incoming and outgoing calls.

FIG. 9 shows the displays on the telephones when John initiates a call to Tommy. In this situation, John's telephone display 91 displays Tommy's telephone number and Tommy's telephone display indicates that a call is being received from John. At this point, John's telephone is initiating a call and so it carries out the method of FIG. 6. This enables one of Tommy's personalised web pages to be selected and provided to John's telephone. Using the pre-specified information from FIG. 8, Tommy only has one possible web page and so this is selected. In the meantime, Tommy's telephone is receiving a call and so it carries out the method of FIG. 7. This enables one of John's personalised web pages to be selected and provided to Tommy's telephone. Because the call is incoming to Tommy, the web page for incoming calls is selected. The resulting displays are shown in FIG. 10.

Thus John's telephone display 91 shows Tommy's home page 93 which contains information that Tommy is travelling this week and a request to be left a voice mail message. However, Tommy's telephone display 92 shows John's incoming call web page 4 which indicates that there is an incoming call from John.

Figure 11:
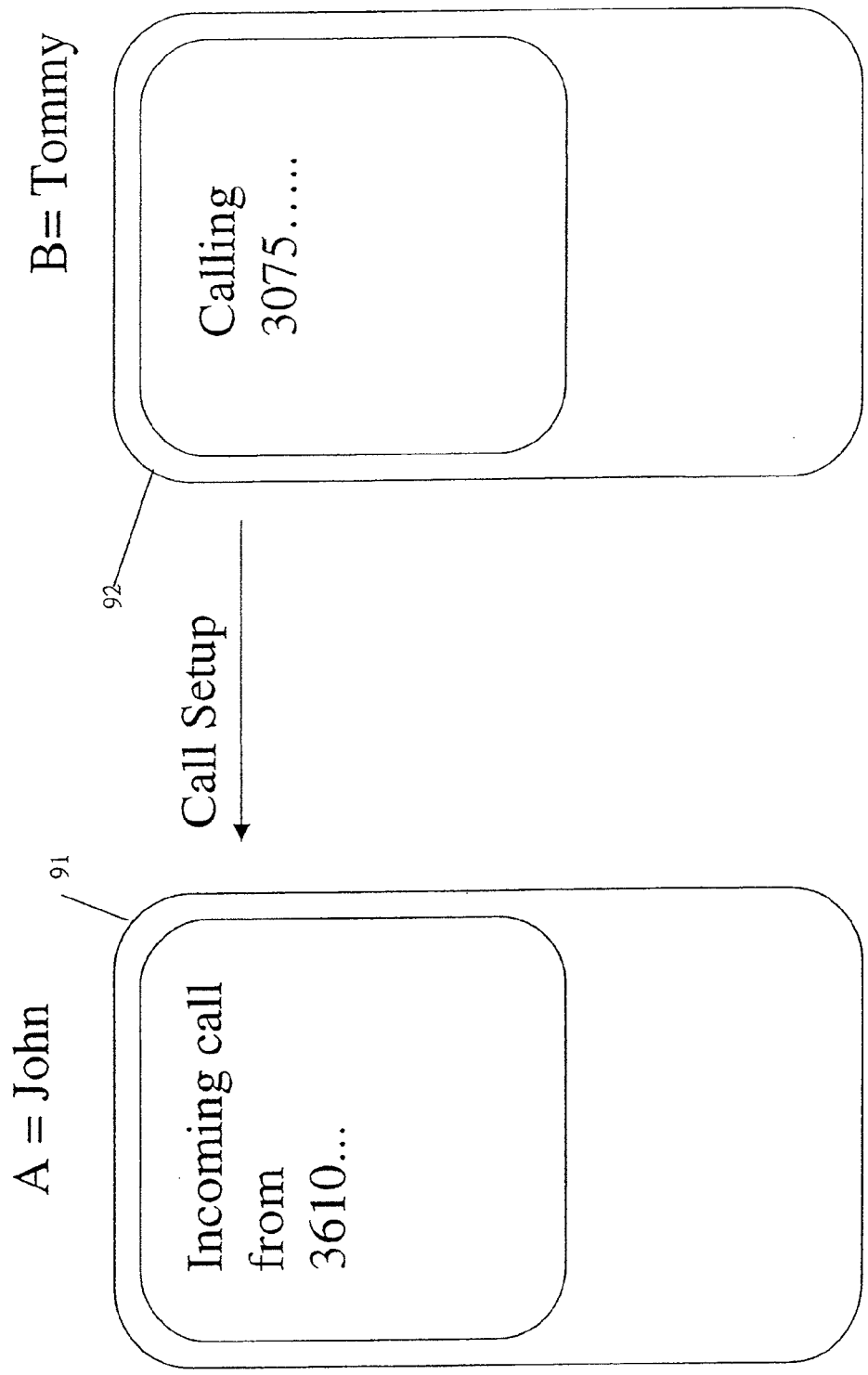
FIG. 11 is a schematic diagram of two mobile telephones showing the displays on those telephones when a call is received.
Figure 12:
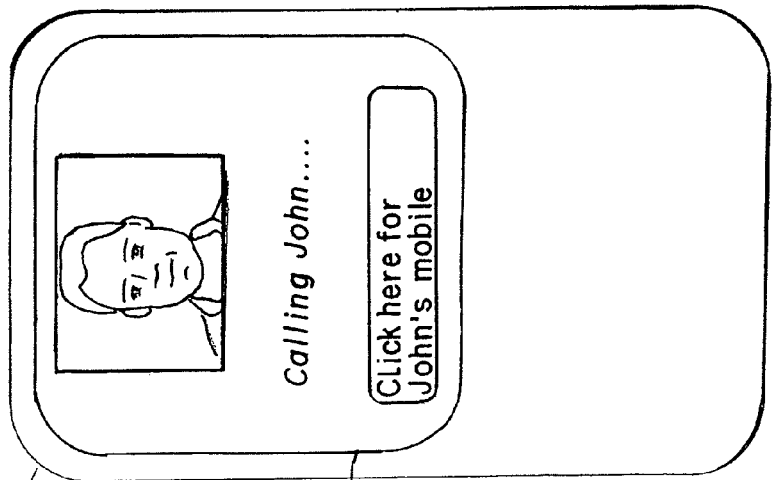
FIG. 12 shows the two mobile telephones of FIG. 11 when personalised web pages are displayed on the telephones.

The situation in which Tommy calls John is now described with reference to FIGS. 11 and 12. The initial telephone displays are shown in FIG. 11. As Tommy calls John, the display on Tommy's phone 92 shows the number being dialled (i.e. John's phone number). As the call is received at John's phone 91 the display on John's phone indicates that an incoming call is arriving from Tommy's phone number.

In the examples described above with respect to John and Tommy, only John's web page varies based on whether he either receives or initiates a call. However, more complex situations are possible, where John and Tommy have several different web pages associated with different types of information about potential calls and with incoming or outgoing calls.

In the embodiments described above which use a web server to store the web pages, that web server may store a plurality of web pages for each of several different users. For example, user A may store five web pages for different types of potential call and user B may store three web pages for different types of potential call. When a web page request is made to the web server from one of the call members that web page request contains information about both the receiver and originator of the call. This enables the set of web pages for one of the call members, say the originator, to be identified in the web server, and then for one of those web pages to be selected, using the information about the other call member, e.g. the receiver.

In the embodiments described above, a modification is possible in the case that a user wishes to access another's web page without completing a call to that person. That is, the methods described herein can also be used to provide a simple way of accessing personalised web pages. Consider the situation where a daughter knows the telephone number of her mother but not the mother's web site address. The daughter is able to use the method of the present invention to initiate a call to the mother and so access the mother's web page(s). If the daughter does not wish to actually complete a call to her mother, an option can be provided whereby the voice, or other type of call to the mother is not completed.

Figure 14:
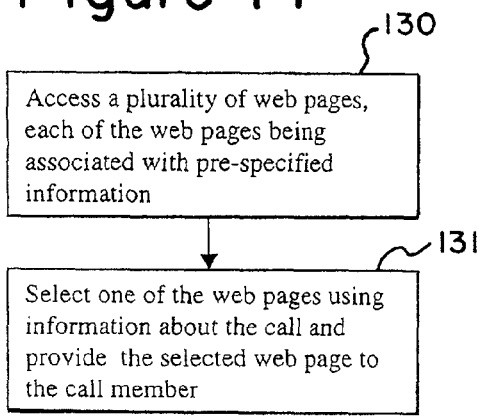
FIG. 14 is a flow diagram of a method for controlling the web server of FIG. 1.

FIG. 14 is a flow diagram of a method carried out by software controlling the web server 14. Any suitable type of computer software may be used to implement this method in order to provide a web page to a first member of a call. The web server is controlled such that it accesses a plurality of web pages; each of the web pages being associated with pre-specified information about potential calls (see box 130 of FIG. 14). The web server is then controlled such that it selects one of the web pages using information about the call and so that it provides that selected web page to the call member (see box 131 of FIG. 14.

Figure 15:
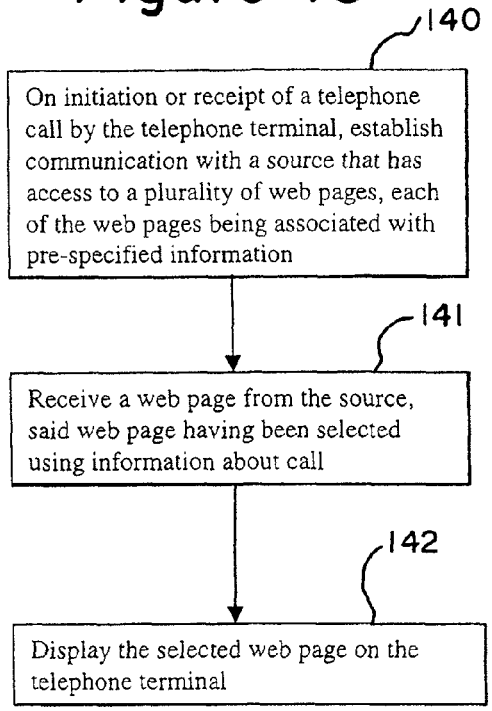
FIG. 15 is a flow diagram of a method carried out by a telephone terminal in order to display a personalised web page on the telephone terminal.

FIG. 15 is a flow diagram of a method carried out by a telephone terminal in order to display a personalised web page on a telephone terminal. On initiation or receipt of a telephone call by the telephone terminal, communication is established with a source that has access to a plurality of web pages. For example, the source may be a web server. Each of the web pages is associated with pre-specified information about potential calls (see box 140 of FIG. 15). The telephone terminal then receives a web page from the source which has been selected using information about the call (see box 141 of FIG. 15). Finally, the telephone terminal displays the selected web page on the telephone terminal (see box 142 of FIG. 15).

A range of applications are within the scope of the invention. These include situations in which it is required to provide a web page to a call member. For example, to provide a personalised web page from a call originator to a call receiver and vice versa.

What is claimed is:

1. A method of providing a web page to a terminal employed by a member of a conference call, comprising:
   maintaining a record of an association between a plurality of web pages and information identifying one or more potential conference call members;
   when the call is in progress and before voice communication is enabled:
   identifying a member of the conference call;
   selecting at least one of the plurality of web pages based on an association in the record between the selected web page and information identifying the member of the call; and providing the selected web page to a terminal employed by a call member.

2. The method of claim 1, further comprising providing the selected web page to a call member on behalf of another call member.

3. The method of claim 1 further comprising selecting another web page by setting up a data call from a call member to a web server on which the another selected web page is stored.

4. The method of claim 1 wherein each of the call members comprises a terminal connected to a communications network over which the call is established.

5. The method of claim 4 wherein each of the terminals comprises a web browser suitable for displaying a web page on the terminal.

6. The method of claim 4 wherein web pages are stored on each of the terminals and at least one of the terminals comprises a mobile phone.

7. The method of claim 1 wherein the information identifying one or more potential call members comprises directory numbers.

8. The method of claim 1, wherein sending information about the terminal to a source having access to one or more of the plurality of web pages or receiving information about the terminal.

9. The method of claim 1, wherein the record of an association between a plurality of web pages and information identifying one or more potential conference call members is maintained on a terminal of at least one of the conference call members, and wherein the terminal is a mobile phone.

10. An apparatus for providing a web page to a terminal employed by a member of a call, comprising:
- a memory including a record of an association between a plurality of web pages and information identifying one or more potential call members;
- an input arranged to access one or more of the plurality of web pages;
- a processor arranged to:
- when the call is in progress and before voice communication is enabled:
 - identify a member of the call;
 - select one of the plurality of web pages based on an association in the record between the selected web page and information identifying the member of the call; and
 - provide the selected web page to a terminal employed by a call member.

11. The apparatus of claim 10 wherein the apparatus includes a web server.

12. The apparatus of claim 10 wherein the input arranged to access one or more of the plurality of web pages is arranged to send java servlets to one or more backend databases where the web pages are stored.

13. A communications network comprising an apparatus as claimed in claim 10.

14. The apparatus of claim 10, wherein the apparatus comprises a mobile phone that includes the memory, the input and the processor.

15. The apparatus of claim 10, wherein the processor is further arranged to send information about the terminal to a source having access to one or more of the plurality of web pages or receiving information about the terminal.

\* \* \* \* \*